(12) United States Patent
Taniguchi et al.

(10) Patent No.: US 10,640,015 B2
(45) Date of Patent: May 5, 2020

(54) SLIDING DEVICE

(71) Applicant: TOYOTA BOSHOKU KABUSHIKI KAISHA, Aichi (JP)

(72) Inventors: Kosuke Taniguchi, Aichi (JP); Masatoshi Hayakawa, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/968,303

(22) Filed: May 1, 2018

(65) Prior Publication Data
US 2018/0339609 A1    Nov. 29, 2018

(30) Foreign Application Priority Data

May 23, 2017  (JP) ................. 2017-101718

(51) Int. Cl.
*B60N 2/08* (2006.01)
*F16C 29/10* (2006.01)
*F16C 29/00* (2006.01)
*B60N 2/07* (2006.01)
*F16C 29/04* (2006.01)

(52) U.S. Cl.
CPC ......... *B60N 2/0881* (2013.01); *B60N 2/0705* (2013.01); *B60N 2/0818* (2013.01); *B60N 2/0875* (2013.01); *B60N 2/0887* (2013.01); *F16C 29/005* (2013.01); *F16C 29/048* (2013.01); *F16C 29/10* (2013.01); *F16C 2326/08* (2013.01)

(58) Field of Classification Search
CPC ... B60N 2/0818; B60N 2/0881; B60N 2/0843
See application file for complete search history.

(56) References Cited

U.S. PATENT DOCUMENTS 9,469,217 B2 * 10/2016 Hayashi ............... B60N 2/0705
9,731,629 B2 *  8/2017 Yamada ............... B60N 2/0705
(Continued)

FOREIGN PATENT DOCUMENTS

DE    102014219233    4/2015
JP    2008-290563    12/2008

OTHER PUBLICATIONS

German Office Action in counterpart German Application No. 10 2018 207 650.2, dated Feb. 12, 2020 (along with partial English-language translation).

*Primary Examiner* — Bradley Duckworth
(74) *Attorney, Agent, or Firm* — Greenblum & Bernstein, P.L.C.

(57) ABSTRACT

Provided is a sliding device that allows two release levers to operate in a synchronous manner. The sliding device includes a lock portion that is displaceable between a locking position and a non-locking position; a release lever configured to be displaced by an operating force; an operation portion provided at a first end of the release lever in an extending direction thereof to receive the operating force; an action portion provided at a second end of the release lever in the extending direction thereof to transmit the operating force to the lock portion via the release lever; and an operating lever provided to the movable rail and displaceable between an operating position to apply the operating force to the operation portion and a non-operating position to apply no operating force to the operation portion.

8 Claims, 13 Drawing Sheets

(56) References Cited

U.S. PATENT DOCUMENTS

| | | | | |
|---|---|---|---|---|
| 9,827,878 B1* | 11/2017 | Matsufuji | ................ | B60N 2/07 |
| 9,855,867 B2* | 1/2018 | Satoh | .................... | B60N 2/0837 |
| 10,086,721 B2* | 10/2018 | Arakawa | ............. | B60N 2/0705 |
| 10,160,351 B2* | 12/2018 | Sugimoto | .............. | B60N 2/123 |
| 10,259,346 B2* | 4/2019 | Taniguchi | ............ | B60N 2/0705 |
| 10,272,802 B2* | 4/2019 | Matsufuji | ............ | B60N 2/0806 |
| 10,279,708 B2* | 5/2019 | Taniguchi | ............ | B60N 2/0705 |
| 2014/0239690 A1* | 8/2014 | Yamada | .................. | B60N 2/07 |
| | | | | 297/344.1 |
| 2015/0090854 A1* | 4/2015 | Hayashi | ............... | B60N 2/0705 |
| | | | | 248/429 |
| 2015/0306979 A1* | 10/2015 | Hayashi | ................ | B60N 2/085 |
| | | | | 248/429 |
| 2017/0341534 A1* | 11/2017 | Taniguchi | ............ | B60N 2/0881 |
| 2017/0341535 A1* | 11/2017 | Taniguchi | ............ | B60N 2/0881 |
| 2018/0009337 A1* | 1/2018 | Kimura | ................ | B60N 2/0715 |
| 2018/0222354 A1* | 8/2018 | Hoshihara | ............ | B60N 2/0818 |
| 2018/0257514 A1* | 9/2018 | Taniguchi | ............ | B60N 2/0818 |

* cited by examiner

SLIDING DEVICE

CROSS-REFERENCE TO RELATED APPLICATIONS

This application claims the benefit of Japanese Patent Application No. 2017-101718 filed on May 23, 2017 with the Japan Patent Office, the entire disclosure of which is incorporated herein by reference.

BACKGROUND

The present disclosure relates to sliding devices that support a vehicle seat in a slidable manner.

A sliding device as disclosed, for example, in Japanese Unexamined Patent Application Publication No. 2008-290563 comprises a fixed rail, a movable rail, and a lock mechanism. The movable rail is mounted to the fixed rail in a slidable manner.

A vehicle seat is mounted and fixed to the movable rail. The lock mechanism comprises a release lever. The release lever is a member to change states between a state of restricting sliding of the movable rail and a state of allowing the movable rail to be slidable.

The sliding devices are arranged on each side of the vehicle seat to support the cushion frame in a slidable manner. That is, at least two sliding devices (such as a pair, or a first and a second, or a left and a right) are used for one vehicle seat.

The release lever on the right side (hereinafter referred to as a "first release lever") and the release lever on the left side (hereinafter referred to as a "second release lever") are operated simultaneously via a single loop handle in most cases. As a result, the first release lever and the second release lever operate synchronously and simultaneously.

Left and right sides may be switched, and may be mirror images.

SUMMARY

In some vehicles, there may be a case (a) in which the first release lever and the second release lever have to be located at different positions along a sliding direction (front-rear) or a vertical direction (up-down), or a case (b) in which the first release lever and the second release lever have substantially different specifications.

In the case (a) or the case (b) above, it is difficult to synchronize the first release lever and the second release lever. In one aspect of the present disclosure, therefore, it is preferable to provide two sliding devices that allow two release levers to operate in a synchronized manner.

One embodiment of the present disclosure is a sliding device for supporting a vehicle seat in a slidable manner. The sliding device comprises a fixed rail; a movable rail that is slidably mounted to the fixed rail and is configured to support the vehicle seat; a lock portion that is displaceable between a locking position restricting sliding of the movable rail, and a non-locking position allowing sliding of the movable rail; a release lever extending in a direction parallel to a longitudinal direction of the movable rail and configured to displace the lock portion toward the non-locking position, the release lever being displaced by an operating force; an operation portion provided at a first end of the release lever in an extending direction thereof to receive the operating force; an action portion provided at a second end of the release lever in the extending direction thereof to transmit the operating force to the lock portion via the release lever; and an operating lever provided to the movable rail and displaceable between an operating position to apply the operating force to the operation portion, and a non-operating position to apply no operating force to the operation portion.

This enables easy adjustment (synchronization) of the release lever by adjusting specifications of the operating lever and the operation portion. Accordingly, even in the case (a) or the case (b) above, the first release lever and the second release lever are allowed to operate in a synchronous manner.

The specifications of the operation portion include, for example, a shape of the operating lever, a distance between the operating lever and the operation portion, and a displacement amount of the operating lever.

The present disclosure may be configured as follows:

The operating lever in the non-operating position may be spaced apart from the operation portion.

This can provide a sliding device that enables easy adjustment of a timing at which the operating lever contacts the operation portion and enables absorption of dimensional variations of the operating lever and the operation portion. Accordingly, it is possible to provide a sliding device that allows two release levers to operate in a synchronous manner.

At least a part of the movable rail may be housed in the fixed rail. The second end of the release lever may be housed in the movable rail. A loading point at which the operation portion and the operating lever contact each other may be located within a given range from a center line, wherein the center line is parallel with the sliding direction of the movable rail, and wherein the center line substantially bisects the operation portion in a width direction.

This reduces generation of torsion in the release lever when an operating force is applied to the operation portion.

The first end of the release lever may be exposed outside the movable rail and may have a first width that is less than a second width of the second end of the release lever. Also, the first end of the release lever may be located in a specified range outside the center line in the width direction.

This allows provision of the sliding device in which the operating lever and the first width of the first end of the release lever are within the second width of the second end of the release lever.

The release lever, the operation portion, and the action portion may be formed from a single tube. This enables formation of a part, having the operation portion, of the release lever by plastic processing of a single tube.

BRIEF DESCRIPTION OF THE DRAWINGS

An embodiment of the present disclosure will be described hereinafter by way of example with reference to the accompanying drawings, in which.

DETAILED DESCRIPTION OF THE PREFERRED EMBODIMENTS

Figure 1:
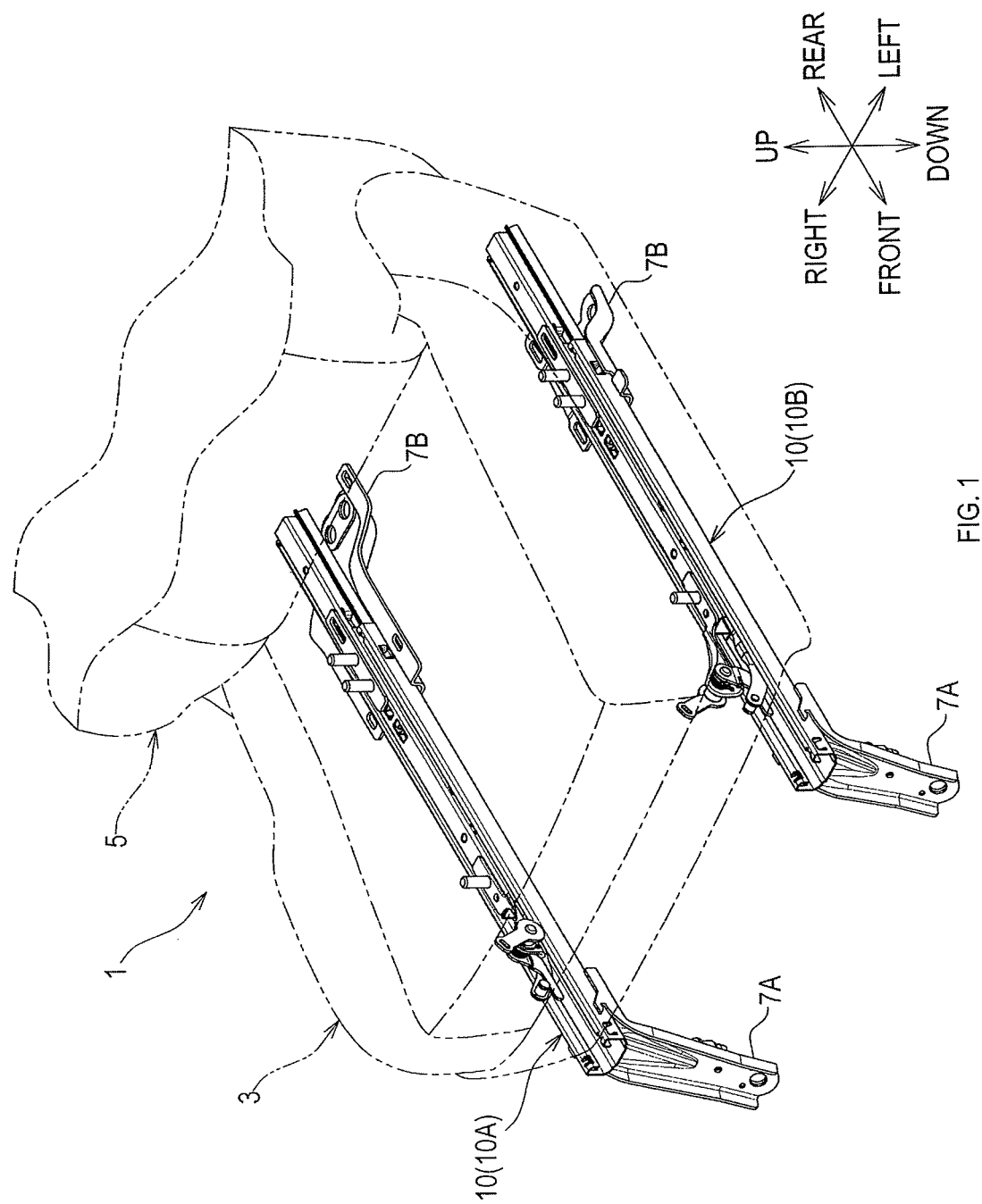
FIG. 1 is a view showing a vehicle seat of the embodiment.

An "embodiment" described below shows one example embodiment within the technical scope of the present disclosure. In other words, matters specifying the invention recited in the claims are not limited to specific configurations, structures, or the like shown in the embodiment below.

Arrows or the like indicating directions in the figures are used for easy understanding of mutual relationships among the figures. Arrows or like (directions) in the figures should not limit the scope of the present disclosure.

A single member may be replaced by multiple members, and multiple members may be replaced by a single member.

First Embodiment

1. Overview of Sliding Device

A sliding device 10 shown in FIG. 1 supports a seat for an automobile (hereinafter referred to as a "vehicle seat") 1 in a slidable manner.

The vehicle seat 1 comprises a seat cushion 3 and a seatback 5. The seat cushion 3 is a portion to support buttocks of an occupant. The seatback 5 is a portion to support a back of the occupant. The term "occupant" as used herein means a passenger in a vehicle or a person who uses a vehicle seat.

The vehicle seat 1 is supported by the sliding devices 10 comprising at least a first (right) sliding device 10A and a second (left) sliding device 10B. The first sliding device 10A is arranged on a right side of the vehicle seat 1 to support a right side of the seat cushion 3.

The second sliding device 10B is arranged on a left side of the vehicle seat 1 to support the seat cushion 3.

The first sliding device 10A and the second sliding device 10B are preferably symmetrical in structure to each other, and may be mirror images. Hereinafter, the sliding devices 10 of the present embodiment will be described taking the first sliding device 10A as an example.

2. Configuration of Sliding Device 2.1 Overview of Sliding Device

Figure 2:
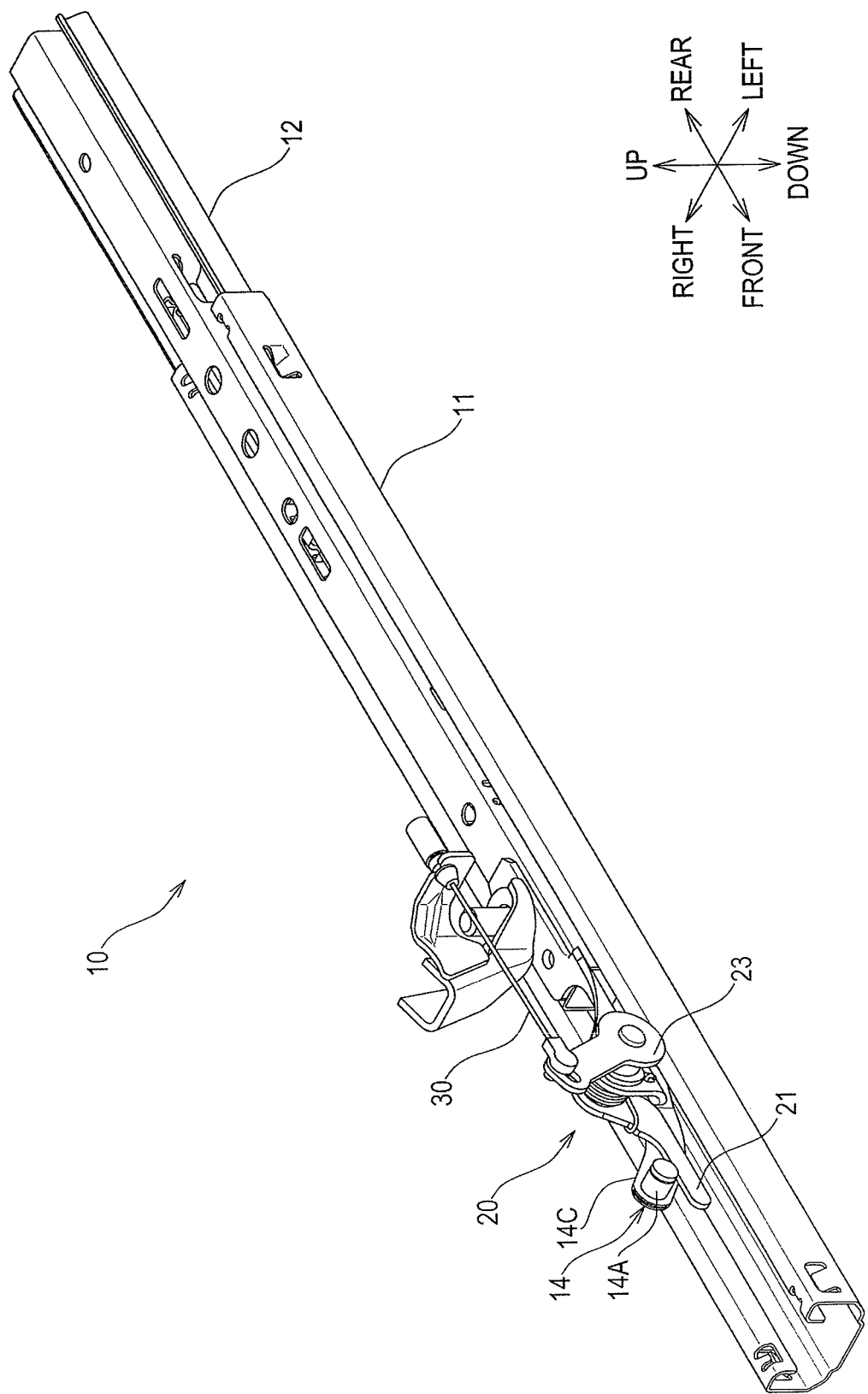
FIG. 2 is a perspective view showing a sliding device of the embodiment.
Figure 3:
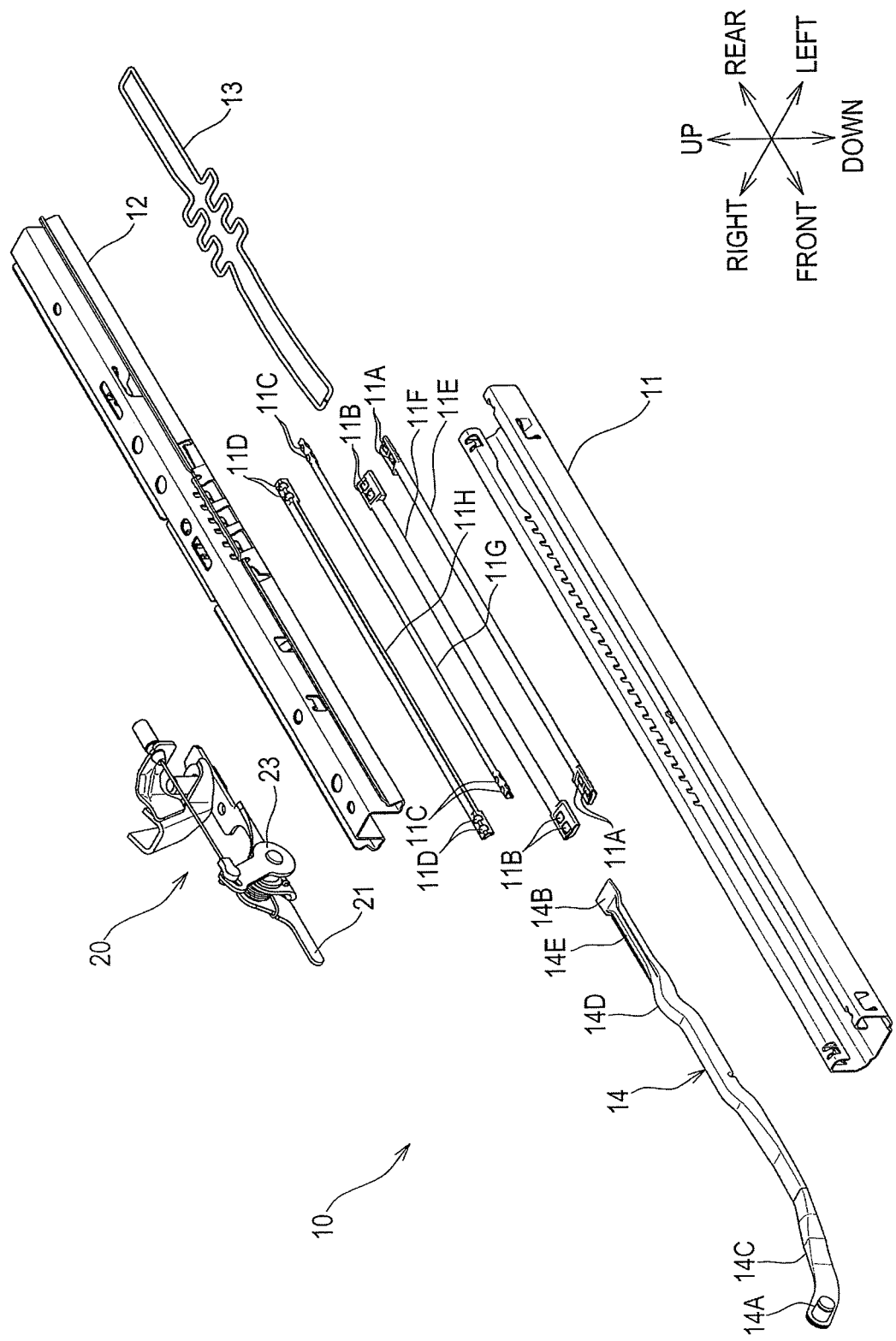
FIG. 3 is an exploded view showing the sliding device of the embodiment.

As shown in FIG. 2 and FIG. 3, the sliding device 10 comprises a fixed rail 11, a movable rail 12, a lock spring 13, and a release lever 14. The fixed rail 11 may be fixed to a floor panel or the like of a vehicle.

The fixed rail 11 of the present embodiment may be fixed to the vehicle via leg brackets 7A, 7B (see FIG. 1). In the present embodiment, the leg brackets 7A, 7B for the first sliding device 10A and leg bracket 7A, 7B for the second sliding device 10B are different in dimensions.

Figure 4:
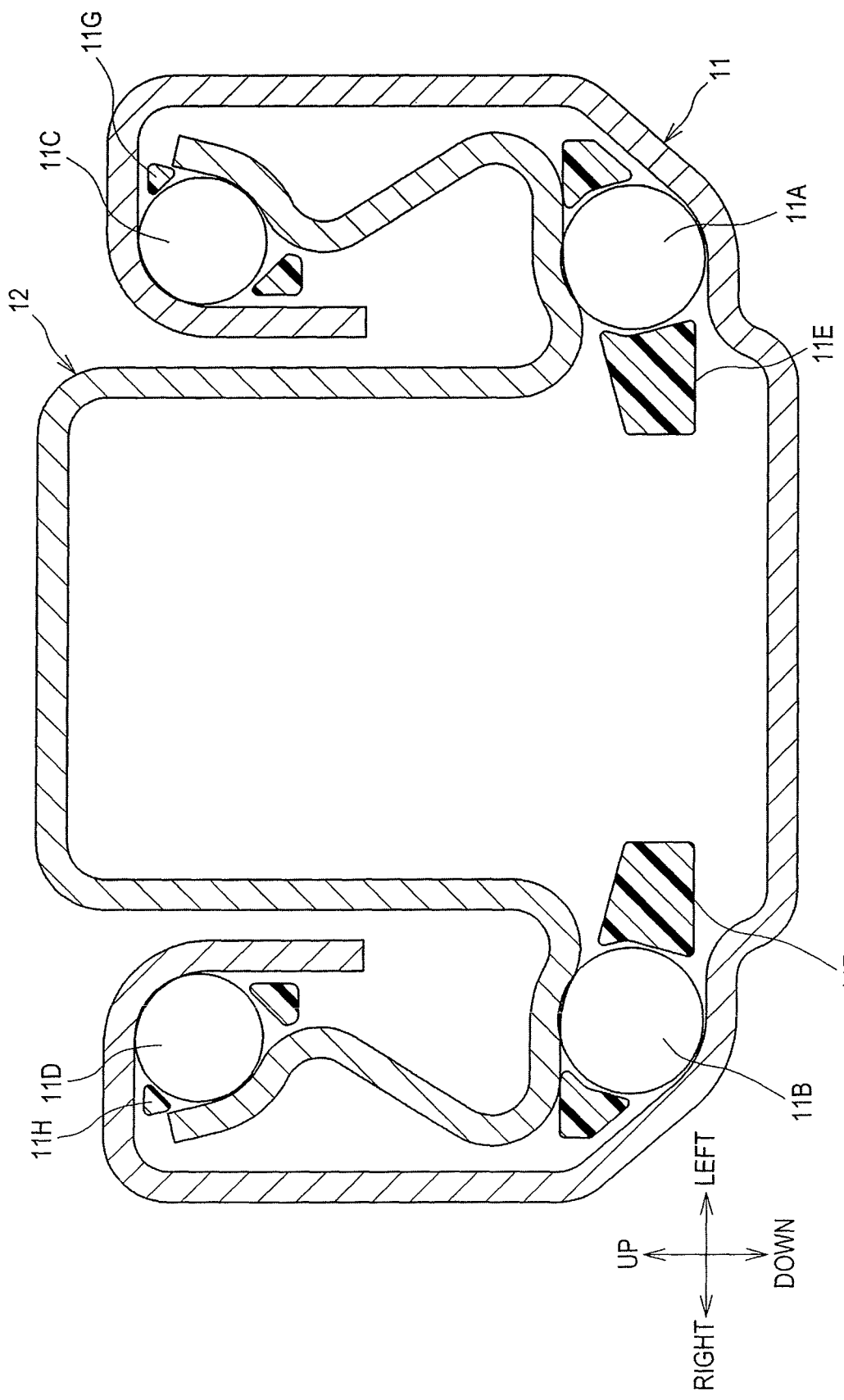
FIG. 4 is a view showing a section that is perpendicular to a seat front-rear direction of the sliding device of the embodiment.

The movable rail 12 is a member that supports the vehicle seat 1 and to which the vehicle seat 1 is fixed. The movable rail 12 is housed in the fixed rail 11 as shown in FIG. 4.

Specifically, the movable rail 12 is supported by the fixed rail 11 via, for example, rolling elements 11A to 11D. Each of the rolling elements 11A to 11D makes rolling contact with the fixed rail 11 and the movable rail 12. This enables the movable rail 12 to be slidingly displaced along a longitudinal direction of the fixed rail 11.

As shown in FIG. 3, two of the rolling elements 11A are arranged at each end of a retainer 11E along a longitudinal direction of the movable rail 12, two of the rolling elements 11B are arranged at each end of a retainer 11F along the longitudinal direction of the movable rail 12, two of the rolling elements 11C are arranged at each end of a retainer 11G along the longitudinal direction of the movable rail 12, and two of the rolling elements 11D are arranged at each end of a retainer 11H along the longitudinal direction of the movable rail 12. Many other configurations for rolling elements are acceptable.

2.2 Lock Mechanism

A lock mechanism is a mechanism to inhibit sliding displacement of the movable rail 12 in a longitudinal (front-rear) direction. The lock mechanism includes the lock spring 13 and the release lever 14. The lock spring 13 is a member to restrict sliding of the movable rail 12 relative to the fixed rail 11.

Figure 5:
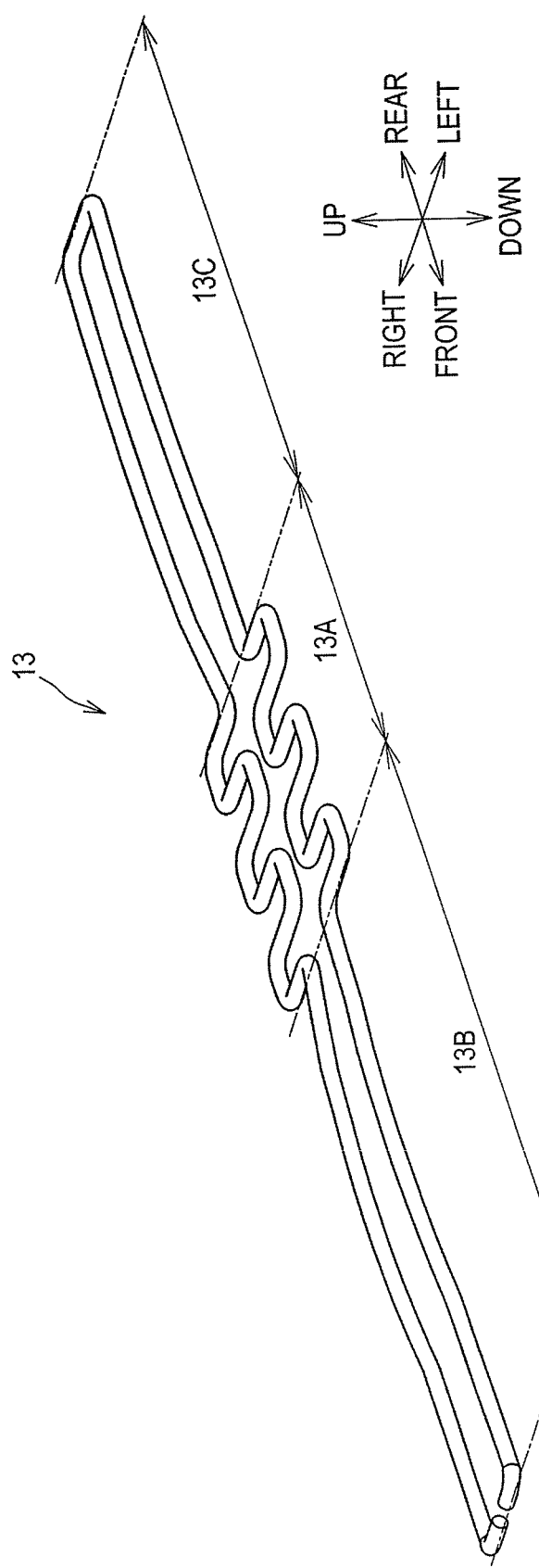
FIG. 5 is a perspective view showing a lock spring of the embodiment.

As shown in FIG. 5, the lock spring 13 comprises a lock portion 13A, a first spring portion 13B and a second spring portion 13C. The lock portion 13A is a portion to engage with the fixed rail 11 and the movable rail 12 in a latching manner.

The first spring portion 13B and the second spring portion 13C, which are elastically deformable portions, support the lock portion 13A so as to be displaceable between a locking position and a non-locking (released) position. The first spring portion 13B and the second spring portion 13C provide an elastic force to hold the lock portion 13A in the locking position (see FIG. 6).

In the locking position, the lock portion 13A engages with the fixed rail 11 and the movable rail 12. As a result, the movable rail 12 is inhibited from sliding relative to the fixed rail 11. The release lever 14 is a member to release the restriction by the lock spring 13 by pushing the lock portion 13A downward into a non-locking (released) position.

The release lever 14 is operated indirectly by the occupant. When the release lever 14 is operated, an operating force elastically deforms the first spring portion 13B and the second spring portion 13C, causing a downward displacement of the lock portion 13A to the non-locking position (see FIG. 7). Specifically, the action portion 14B contacts and pushes downward upon the lock portion 13A.

Thus, engagement of the lock portion 13A with the fixed rail 11 and the movable rail 12 is released. When the operating force acting on the release lever 14 is removed, the first spring portion 13B and the second spring portion 13C are restored to an original state. As a result, the lock portion 13A returns (is displaced upwardly) to the locking position.

The lock spring 13 of the present embodiment is obtained by bending a metal wire material having toughness, such as a spring steel material. That is, the first spring portion 13B, the lock portion 13A, and the second spring portion 13C are integrally formed by metal.

2.3 Operation Mechanism

Figure 8:
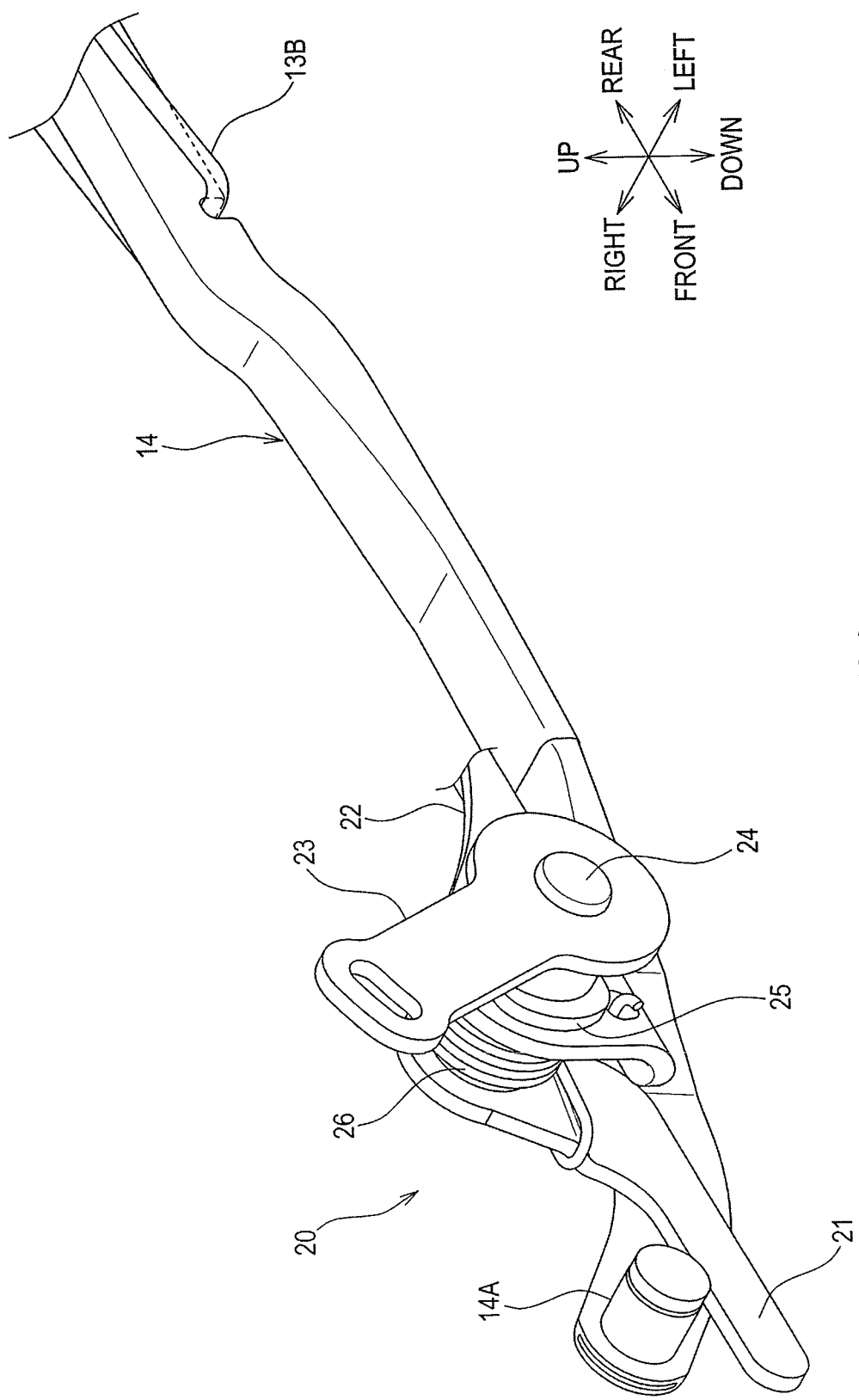
FIG. 8 is a perspective view showing an operation mechanism of the embodiment.

An operation mechanism 20 shown in FIG. 8 is a mechanism to transmit the operating force caused by the occupant's operation to the release lever 14.

<Release Lever>

Figure 9:
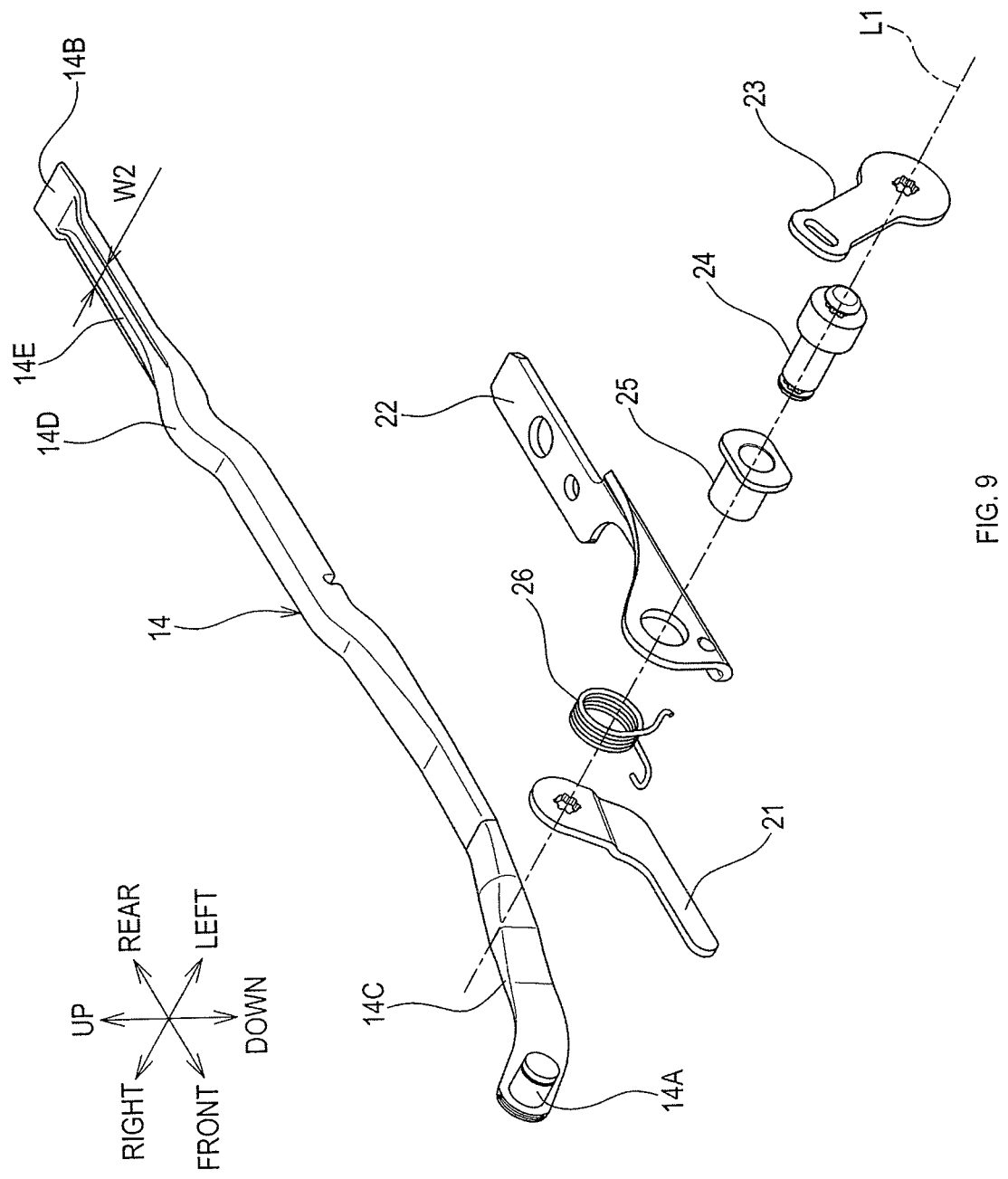
FIG. 9 is a view showing a release lever and other components of the embodiment.

As shown in FIG. 9, the release lever 14 comprises an operation portion 14A and an action portion 14B. The operation portion 14A is configured to receive an operating force (that pushes up). The operation portion 14A is provided at a first (front) end 14C of the release lever 14 in an extending direction of the release lever 14, in the present embodiment. Alternatively, the operation portion may be at a rear end of a release lever.

The action portion 14B is configured to transmit the operating force that has been transmitted via the release lever 14 to the lock portion 13A. The action portion 14B is provided at a second (rear) end 14E of the release lever 14 in the extending direction of the release lever 14.

Figure 11:
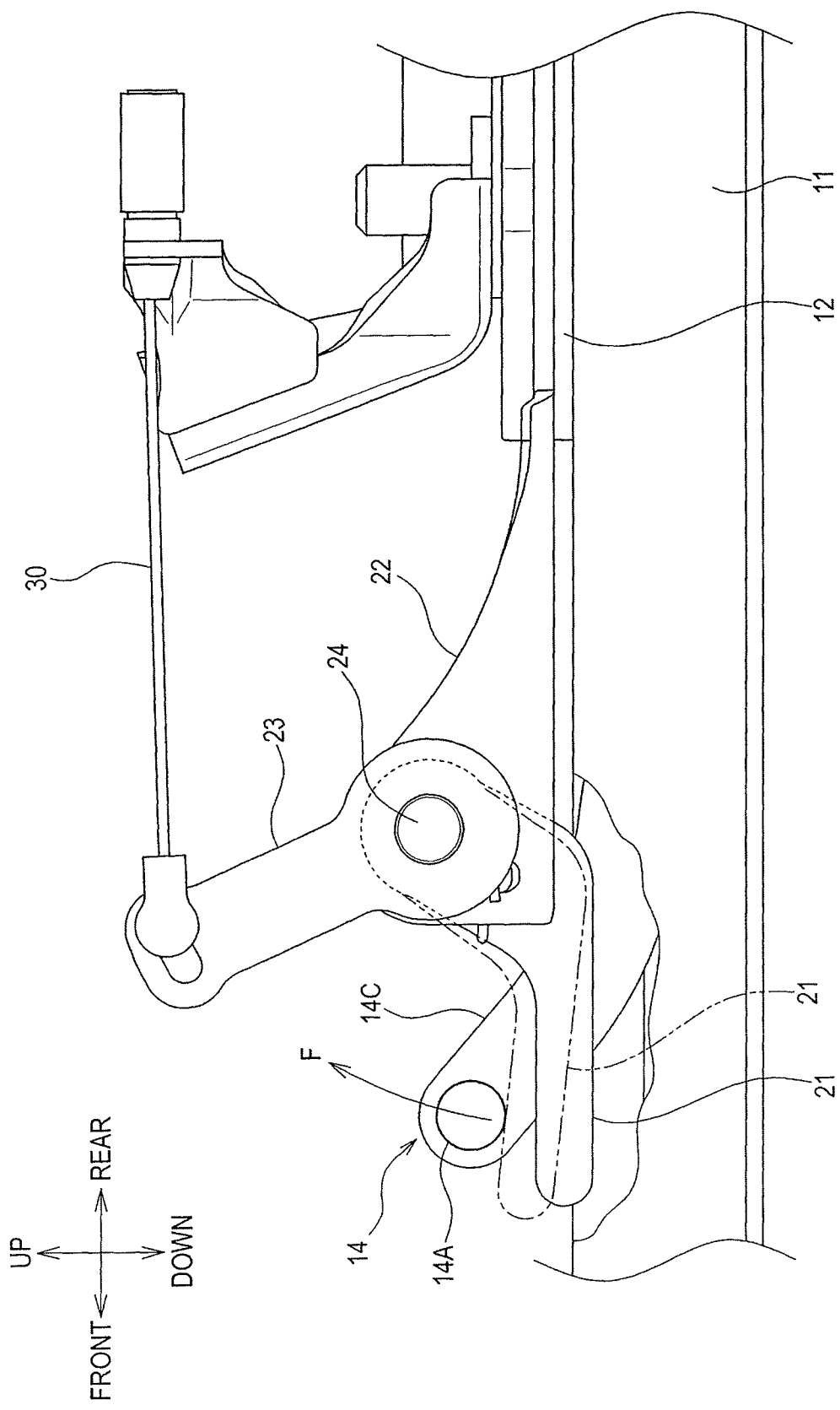
FIG. 11 is a view showing the operation mechanism of the embodiment.

The first end 14C of the release lever 14 is exposed outside the movable rail 12 (see FIG. 11). The first end 14C has a first width W1 (see FIG. 12) that is less than a second width W2 (see FIG. 9) of the second end 14E of the release lever 14.

Figure 10:
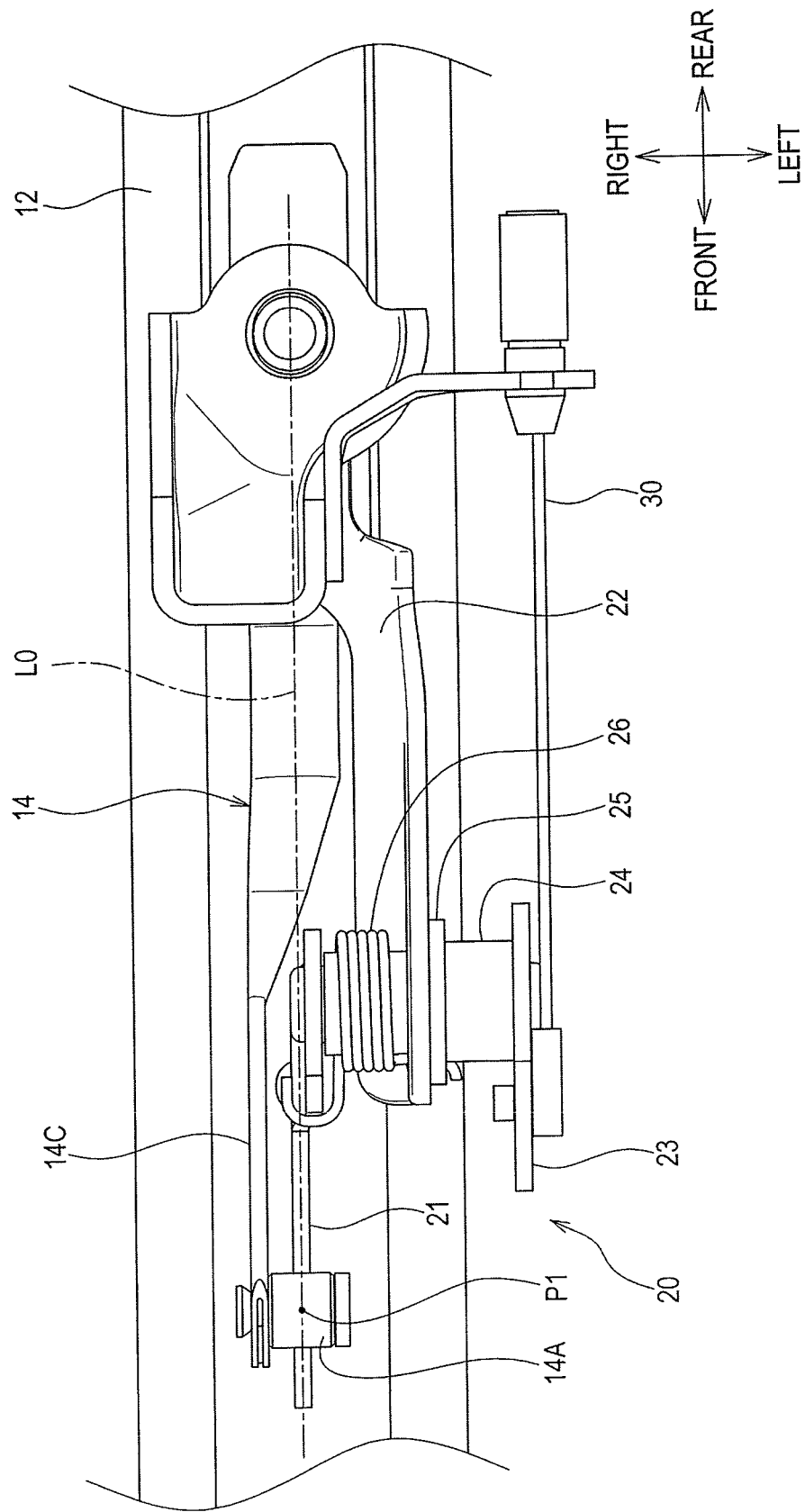
FIG. 10 is a view showing the operation mechanism of the embodiment.

A "width direction" here means a horizontal direction that is substantially perpendicular to the longitudinal direction of the movable rail 12. In the present embodiment, the width direction coincides with the seat width direction, that is, a right-left direction of a vehicle. Hereinafter, a virtual line that passes through a center in the width direction of the action portion 14B and is parallel to the longitudinal direction of the movable rail 12 is referred to as a center line L0 (see FIG. 10). In other words, the center line L0 is parallel with the sliding direction of the movable rail and substantially bisects the operation portion in the width direction.

Figure 13:
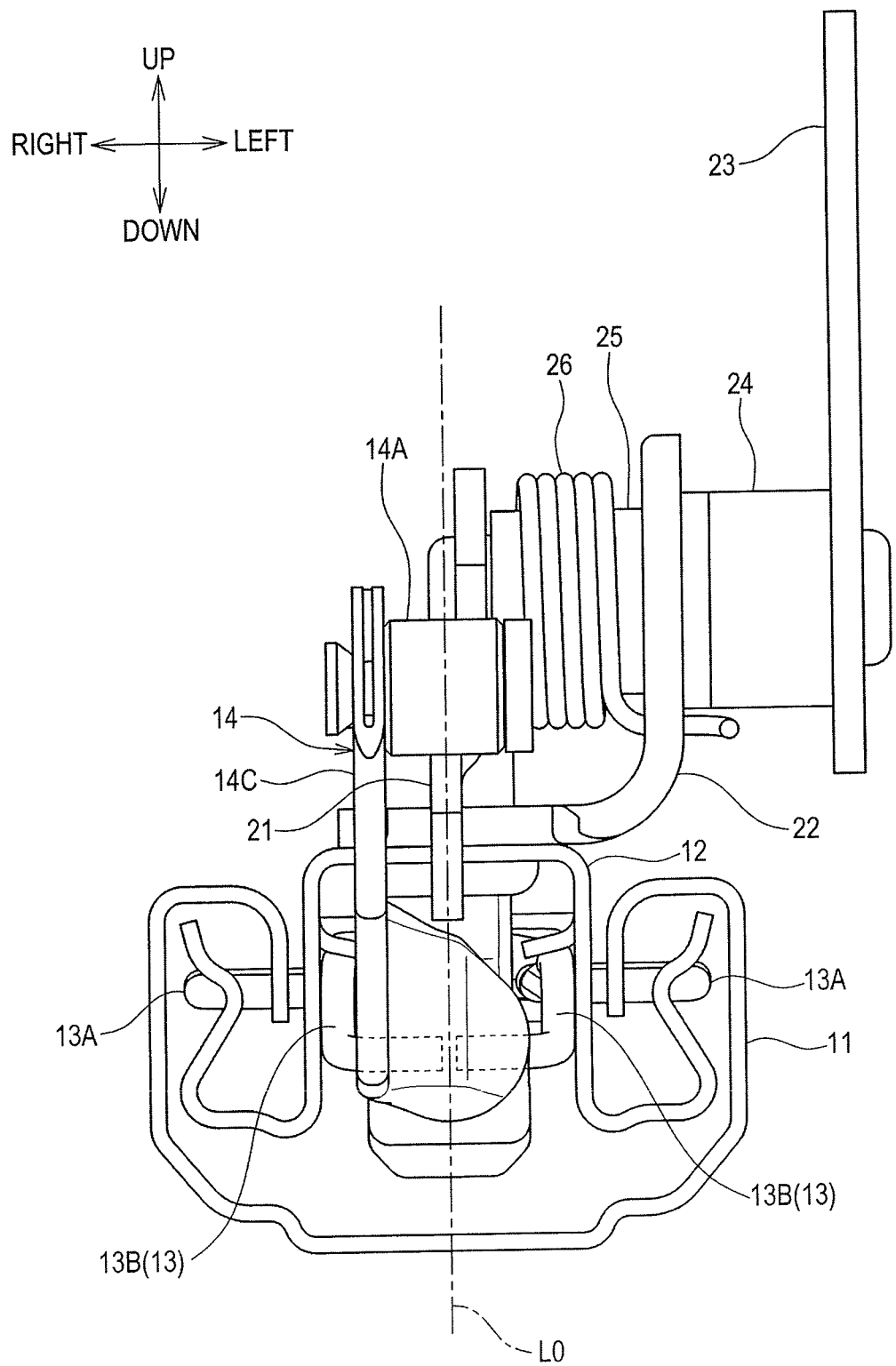
FIG. 13 is a view showing the operation mechanism of the embodiment.

As shown in FIG. 13, the first end 14C of the release lever 14 is located in a specified range outside the center line L0 in the width direction. The "specified range" means, for example, a range that can ensure a gap between the first end 14C and an operating lever 21 to avoid mutual interference therebetween.

The release lever 14 of the present embodiment is preferably formed by plastic processing of a tube. That is, the first end 14C and the action portion 14B are integrally formed with the release lever 14.

<Operating Lever>

Figure 6:
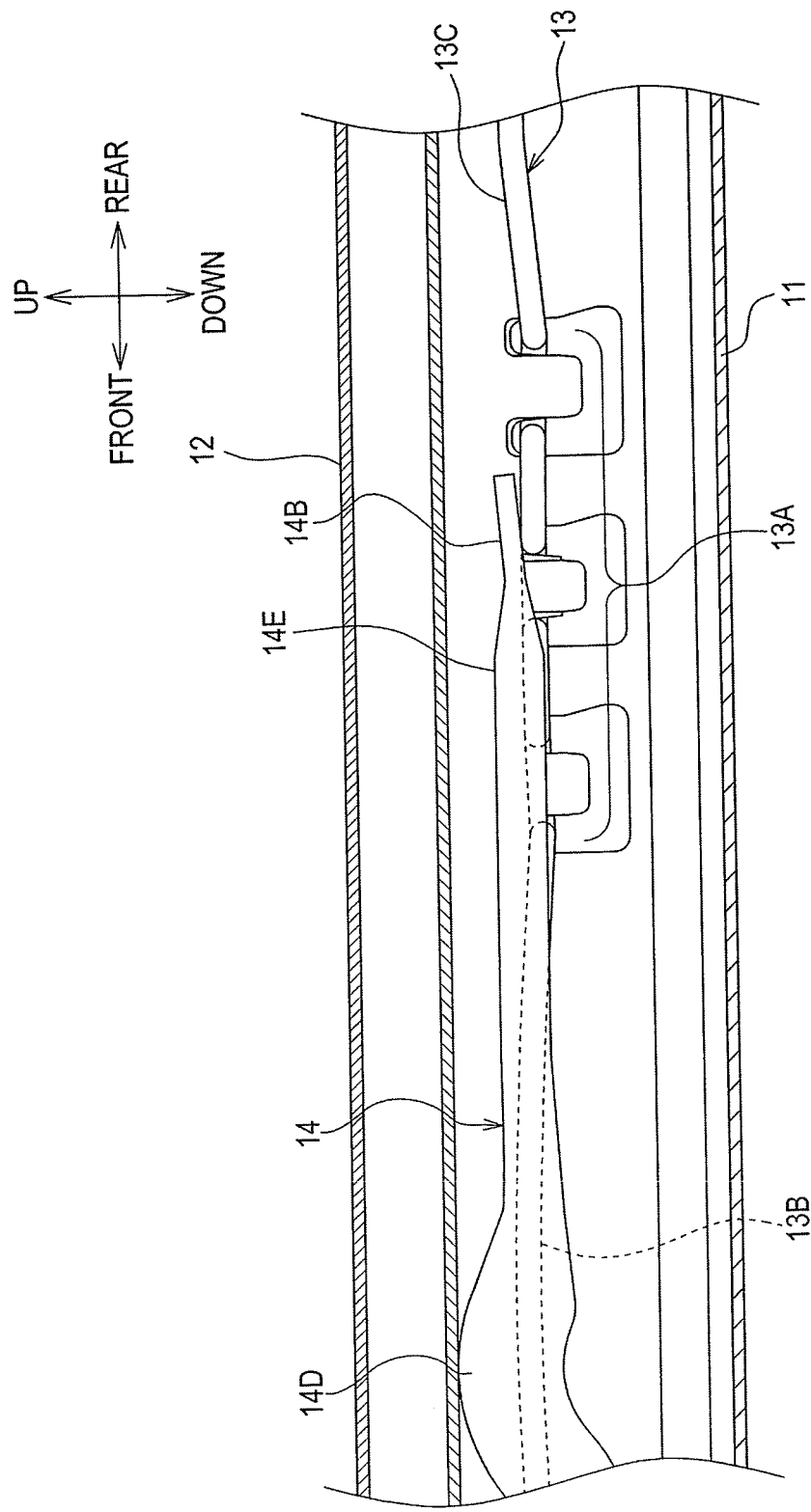
FIG. 6 is a view showing an operation of the sliding device of the embodiment.
Figure 7:
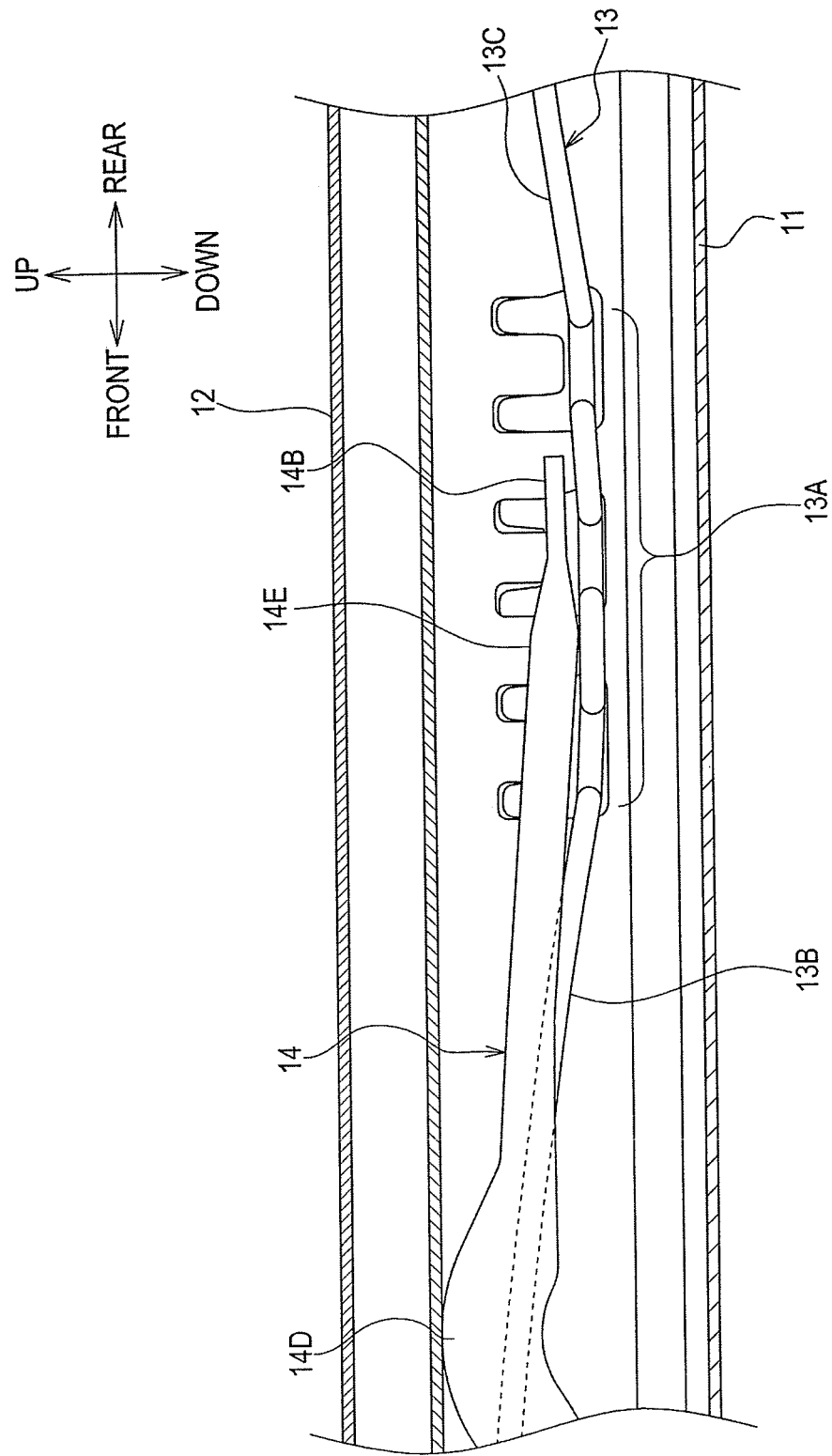
FIG. 7 is a view showing an operation of the sliding device of the embodiment.

As shown in FIG. 11, the operating lever 21 is a member that is displaceable between: an operating position (a position indicated by a two-dot chain line in FIG. 11, and causing release of the lock spring 13 as shown in FIG. 7) to apply an operating force F to the operation portion 14A; and a non-operating position (a position indicated by a solid line in FIG. 11, and allowing the lock spring 14 to return to a locking or engaged position as shown in FIG. 6) to apply no operating force F to the operation portion 14A.

The operating lever 21 is pivotably mounted to a lever bracket 22 via a rotation shaft 24 and a bushing 25. That is, the operating lever 21 is pivotally displaced between the operating position and the non-operating position. The lever bracket 22 is fixed to the movable rail 12. Thus, the operation mechanism 20 is slidingly displaced integrally with the movable rail 12.

Figure 12:
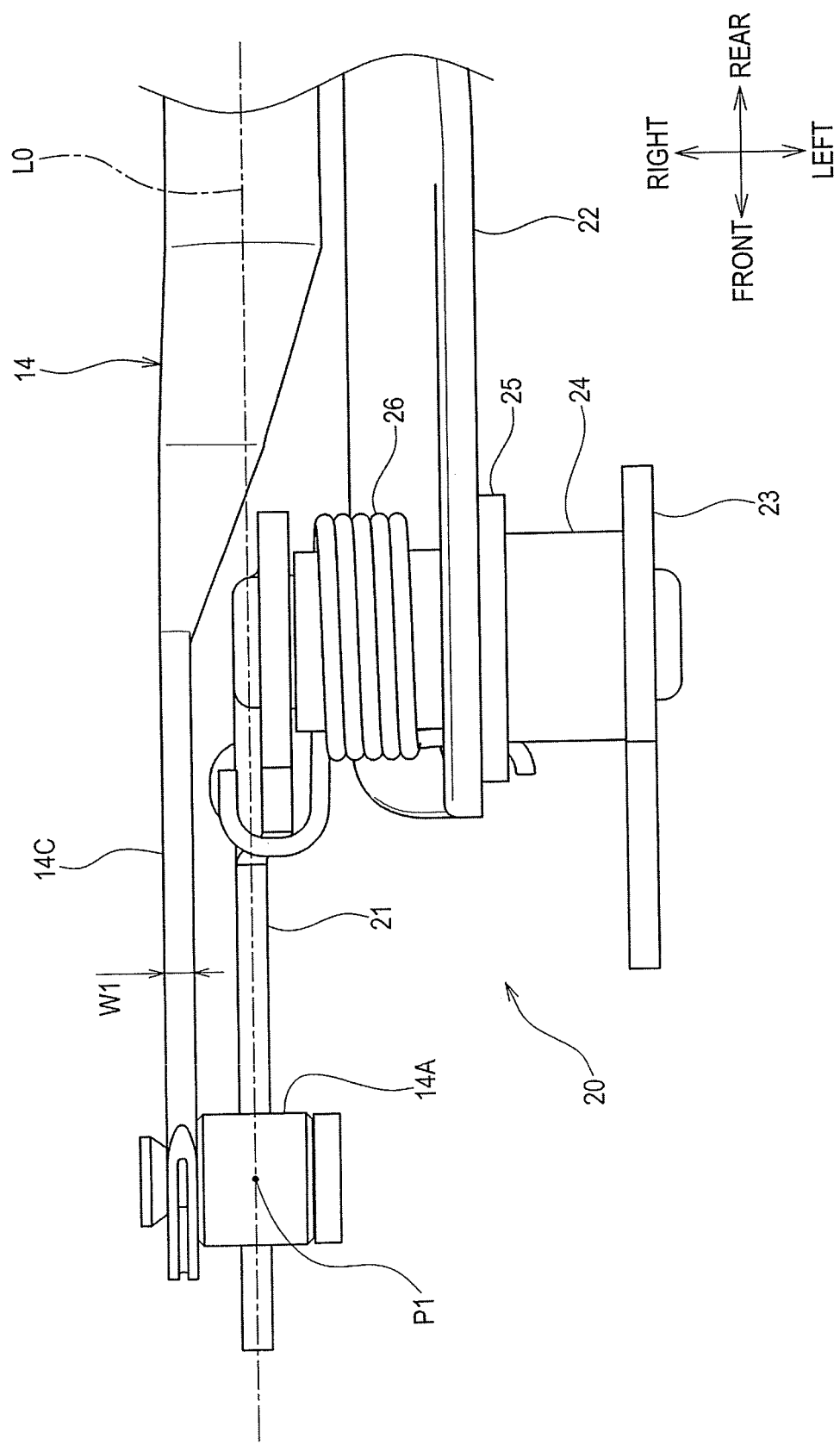
FIG. 12 is a view showing the operation mechanism of the embodiment.

In the non-operating position, the operating lever 21 is preferably spaced from the operation portion 14A. In other words, when the operating lever 21 is in the non-operating position, there is a gap between the operating lever 21 and the operation portion 14A. When the operating lever 21 is in the operating position, a loading point P1 at which the operation portion 14A and the operating lever 21 contact each other is located within a given range from the center line L0, as shown in FIG. 12.

The "given range" here means a range in which a torsional moment that is generated in the release lever 14 when an operating force F is applied to the operation portion 14A has a given magnitude or less. The "given magnitude" means a magnitude at which a maximum shear stress generated in the release lever 14 by torsion is less than or equal to an allowable shear stress.

The torsional moment here is a torsional moment around the center line L0. Thus, the torsional moment is greater as a deviation amount between the loading point P1 and the center line L0 is greater. As the torsional moment is greater, a shear stress generated in the release lever 14 is greater.

The operation portion 14A comprises a columnar or cylindrical roller that is preferably rotatably mounted to the first end 14C of the release lever 14. When the operating lever 21 contacts the operation portion 14A, and an upward operating force is applied to the operation portion 14A (see FIG. 11), the release lever 14 is swingingly displaced around a swinging fulcrum 14D (see FIG. 6 and FIG. 7).

Specifically, when an operating force F (see FIG. 11) is applied to the operation portion 14A, the operation portion 14A is swingingly displaced upward around the swinging fulcrum 14D. When the operating lever 21 is released, then the spring 26 rotates the operating lever 21 downward so that it is spaced apart from the operation portion 14A (see the solid outlined operating lever 21 in FIG. 11), and the operation portion 14A is similarly swingingly displaced downward around the swinging fulcrum 14D due to a restoring force of the lock spring 13.

As shown in FIG. 11, the operating force is transmitted to the operating lever 21 via a control cable 30. Specifically, a first end of the control cable 30 is coupled to a transmission lever 23 of the operation mechanism 20. A second end of the control cable 30 is coupled to an operation lever (not shown). The operation lever is a member to be operated by the occupant. The operation lever may operate the first (right) sliding device and the second (right) sliding device simultaneously.

As shown in FIG. 9, the transmission lever 23 is coupled to a first axial end of a rotation shaft 24. The operating lever 21 is coupled to a second axial end of the rotation shaft 24. The rotation shaft 24 comprises an engagement portion, such as a spline or a serration, at each of the first and second axial ends.

Accordingly, the operating lever 21 pivots integrally with the transmission lever 23 via the rotation shaft 24. The rotation shaft 24 is rotatably held by the lever bracket 22 via an optional bushing 25. The bushing 25 forms a bearing portion that slidingly contacts the rotation shaft 24.

A spring 26 provides an elastic force to displace the operating lever 21 toward the non-operating position. When the control cable 30 is pulled by the occupant, an elastic deformation amount of the spring 26 is increased. When a tension of the control cable 30 is removed, the spring 26 is restored to its original state, causing displacement of the operating lever 21 toward the non-operating position.

3. Features of Sliding Device of Present Embodiment

In the present embodiment, a displacement center L1 (also known as a rotational axis of the rotational shaft 24, see FIG. 9) of the release lever 14 of the first sliding device. 10A and a displacement center L1 of the release lever 14 of the second sliding device 10B might not be coaxial. For example, in FIG. 1, these displacement centers are offset slightly in a sliding direction of the movable rail 12 and slightly in a vertical direction (see FIG. 1).

Also, the sliding device 10 of the present embodiment comprises the operating lever 21 that is displaceable between the operating position (to apply an operating force to the operation portion 14A) and the non-operating position (to apply no operating force to the operation portion 14A).

This enables easy synchronization of the release lever 14 by adjusting specifications of the operating lever 21 and the operation portion 14A.

Accordingly, use of the sliding device 10 of the present embodiment enables synchronous operation of the release lever 14 of the first sliding device 10A and the release lever 14 of the second sliding device 10B. This synchronization occurs even in a case (a) in which the release lever 14 of the first sliding device 10A and the release lever 14 of the second sliding device 10B have to be located at different positions along the sliding direction (front-rear) or the vertical direction (up-down), or in a case (b) in which the release lever 14 of the first sliding device 10A and the release lever 14 of the second sliding device 10B have substantially different specifications.

The specifications of the operating lever 21 and the operation portion 14A may include, for example, a shape of the operating lever 21, a distance between the operating lever 21 and the operation portion 14A, and a displacement amount of the operating lever 21.

In the non-operating position, the operating lever 21 is spaced apart from the operation portion 14A. This allows provision of the sliding device 10 that can easily adjust when the operating lever 21 contacts the operation portion 14A, and can also absorb dimensional variations of the operating lever 21 and the operation portion 14A.

At least a part of the movable rail 12 is housed in the fixed rail 11, and the second end 14E of the release lever 14 is housed in the movable rail 12. The loading point P1 at which the operation portion 14A and the operating lever 21 contact each other is located within a given range from the center line L0. This reduces generation of torsion in the release lever 14 when an operating force is applied to the operation portion 14A.

The first end 14C of the release lever 14 is exposed outside the movable rail 12, and the first width W1 of the first end 14C is less than the second width W2 of the second end 14E of the release lever 14. Also, the first end 14C of the release lever 14, at which the operation portion 14A is provided, is located in the specified range outside the center line L0 in the width direction.

This allows provision of the sliding device 10 in which the operating lever 21 and the first width W1 of the first end 14C, having the operation portion 14A, of the release lever 14 are within the second width W2 of the second end 14E.

The release lever 14 is formed of a tube. This enables formation of a part, having the operation portion 14A, of the release lever 14 by plastic processing.

Other Embodiments

For example, the operating lever 21 may be operated using a loop handle.

For example, the operation portion 14A and the operating lever 21 may contact each other when the operating lever 21 is in the non-operating position.

For example, the loading point P1 may be provided outside the given range from the center line L0.

The first width W1 of the first end 14C need not be less than the second width W2 of the second end 14E of the release lever 14. Also, the first end 14C need not be located in the specified mange outside the center line L0 in the width direction.

For example, the action portion 14B and the first end 14C may be produced as separate components from the release lever 14, and subsequently the action portion 14B and the first end 14C may be manufactured into the release lever 14 by welding or the like.

The sliding device 10 may be applicable to seats for use in vehicles, such as railroad vehicles, ships, and aircrafts, and to stationary seats for use in theaters and households.

Further, the present disclosure is not limited to the above-described embodiments, but may be in various forms within the scope of the invention defined by the appended claims. Accordingly, at least two embodiments of the above-described plurality of embodiments may be combined.

What is claimed is:

1. A sliding device for supporting a vehicle seat in a slidable manner, the sliding device comprising:
   a fixed rail;
   a movable rail that is slidably mounted to the fixed rail and is configured to support the vehicle seat;
   a lock portion that is displaceable between a locking position restricting sliding of the movable rail, and a non-locking position allowing sliding of the movable rail;
   a release lever extending in a direction parallel to a longitudinal direction of the movable rail and configured to displace the lock portion toward the non-locking position, the release lever being displaced by an operating force;
   an operation portion provided at a first end of the release lever in an extending direction of the release lever to receive the operating force, the operation portion being positioned outside the movable rail, the operation portion comprising a columnar or cylindrical roller that is rotatably mounted to the first end;
   an action portion provided at a second end of the release lever in the extending direction of the release lever to transmit the operating force to the lock portion via the release lever; and
   an operating lever provided to the movable rail and displaceable between an operating position to apply the operating force to the operation portion, and a non-operating position to apply no operating force to the operation portion.

2. The sliding device according to claim 1, wherein the operating lever in the non-operating position is spaced apart from the operation portion.

3. The sliding device according to claim 1,
   wherein at least a part of the movable rail is housed in the fixed rail,
   wherein the second end of the release lever is housed in the movable rail, and
   wherein a loading point at which the operation portion and the operating lever contact each other includes a center line of the operation portion,
   wherein the center line is parallel with the sliding direction of the movable rail, and
   wherein the center line substantially bisects the operation portion in a width direction of the operation portion.

4. The sliding device according to claim 3,
   wherein the first end of the release lever is exposed outside of the movable rail and has a first width that is less than a second width of the second end of the release lever, and
   wherein the first end of the release lever is arranged at a position that does not overlap the center line of the operation portion and in which a gap is formed between the first end and the operating lever to avoid mutual interference therebetween.

5. The sliding device according to claim 4, wherein the release lever, the operation portion, and the action portion are formed from a single tube.

6. A vehicle seat for installation in a vehicle, the vehicle seat comprising:
a first sliding device according to claim 1 that supports a right side of a seat cushion in a seat width direction; and
a second sliding device according to claim 1 that supports a left side of the seat cushion in the seat width direction,
wherein a rotational axis of the release lever of the first sliding device and a rotational axis of the release lever of the second sliding device are offset in at least one of a sliding direction of the movable rail or in a vertical direction.

7. The sliding device according to claim 1, wherein the operation portion comprises a columnar or cylindrical roller that is rotatably mounted to the first end of the release lever.

8. The sliding device according to claim 1, further comprising
an operation mechanism to swing the operation lever relative to the movable rail,
wherein the operation mechanism comprises a control cable that transmits an operating force to swing the operation lever to the movable rail.

* * * * *